(12) United States Patent
Kim

(10) Patent No.: US 6,594,400 B1
(45) Date of Patent: Jul. 15, 2003

(54) METHOD OF REMOVING BLOCK PHENOMENON AND RING PHENOMENON IN COMPRESSION CODED IMAGE

(75) Inventor: Jae Min Kim, Kang-won-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/379,463

(22) Filed: Aug. 24, 1999

(30) Foreign Application Priority Data

Aug. 31, 1998 (KR) .......................................... 1998-35507

(51) Int. Cl.[7] .............................. G06T 5/00; G06K 9/40; H04N 1/409
(52) U.S. Cl. ........................................ 382/268; 382/261
(58) Field of Search ................................. 382/268, 260, 382/261, 275; 375/240.29; 348/607

(56) References Cited

U.S. PATENT DOCUMENTS

| 5,940,536 A | * | 8/1999 | Wake et al. ................. 382/260 |
| 6,041,145 A | * | 3/2000 | Hayashi et al. ............. 382/268 |
| 6,226,050 B1 | * | 5/2001 | Lee ............................. 382/268 |
| 6,259,823 B1 | * | 7/2001 | Lee et al. .................... 382/268 |

FOREIGN PATENT DOCUMENTS

| JP | 9-326024 | 12/1997 |
| JP | 10-70719 | 3/1998 |

* cited by examiner

Primary Examiner—Scott Rogers
(74) Attorney, Agent, or Firm—Fleshner & Kim, LLP

(57) ABSTRACT

A method and apparatus to remove a block effect and a ring effect appearing in a compression-coded image is disclosed. The present invention is especially applicable to an image compression-coded at a low bit rate. In particular, the present invention includes a variety of masks for the removal of the block/ring effect. Thus, one mask is select for a pixel to be filtered. Moreover, candidate pixels to be averaged with the pixel to be filtered is selected from the pixels of the selected mask to better maintain the details of the image, and a weight is applied to improve the calculation speed of the averaging operation. More particularly, the masks according to the present invention have longer tabs toward adjacent blocks at boundaries of the given block to remove the block and ring effect.

20 Claims, 2 Drawing Sheets

METHOD OF REMOVING BLOCK PHENOMENON AND RING PHENOMENON IN COMPRESSION CODED IMAGE

FIELD OF THE INVENTION

The present invention relates to an image decoder and more particularly, to a method of removing a block effect and ring effect which appear in a compression-coded image of an image decoder. The present invention is especially applicable to reduce the block and ring effects appearing in an image coded at a very low bit rate.

DISCUSSION OF THE RELATED ART

To encode either a still or motion image using a process based upon a discrete cosine transform (DCT), the image is divided into a plurality of segments. Typically, the image is divided into 8×8 segment blocks and the DCT operation is executed for each block. However, an inter-block correction information cannot be obtained by such a block-based DCT operation, thereby causing a visual discontinuity effect, known as the block effect, to appear at boundaries between adjacent blocks.

Generally, when the DCT operation is performed on an original image, most of the significant information would be concentrated within the lower-frequency components rather than the higher-frequency components. Thus, the low-frequency components of the block-based DCT process would include a large amount of correlation information regarding adjacent blocks. However, the block-based DCT process lacks the inter-block correlation information. As a result, if the low-frequency components are quantized on a block-by-block basis, a continuity is lost between adjacent blocks, resulting in the block effect in a reconstructed image.

Also, by quantizing the coefficients obtained from the DCT process, the number of bits is reduced. Namely, as the interval of the quantization step 'q' increases, the number of components to be coded reduces, resulting in a reduction in the number of bits. At the same time, however, the high-frequency components of the original image is lost, causing a distortion called the ring effect in the reconstructed image. The ring effect increases with the quantization step interval and is especially apparent in object contours of the reconstructed image.

The cause of the block effect and the ring effect may generally be deemed as a loss of information in the original image. Moreover, with a lower bit rate, the loss of information is more sever and, the block effect and/or ring effect becomes more significant.

One simple method to reduce the block effect and/or the ring effect is a low pass filtering (LPF). For example, an averaging operation or a digital signal process which substantially has the effect of a LPF may be used to remove the block effect or ring effect.

One LPF technique is based on the averaging operation, including a filtering masking by which nine pixels are selected. Basically, a given pixel and eight pixels surrounding the given pixel are selected as the nine (3×3) pixels. Thereafter, the nine pixels are summed and divided by nine to obtain the average pixel value. However, this LPF technique is disadvantageous because it further filters object contours which are important factors for image recognition. Other LPF techniques are variants on the application of the filtering masking in consideration of the form and pixels selected.

Another method to reduce the block effect and/or the ring effect is an adaptive LPF in which an image is partitioned into blocks according to the directions of the image contours. A filter suitable to the contour directions of the partitioned blocks is then employed. The adaptive LPF can be applied to a local image characteristic by partitioning a reconstructed image into blocks according to the object contours of the reconstructed image. However, the directions of the object contours is difficult to find when performing a coding operation at a low bit rate. Thus, the adaptive LPF cannot be applied in a very low bit rate coding.

Other block/ring effect reduction methods include repeating processes at a frequency domain and image domain under a predetermined restriction; utilizing both the previous information of an original image and the transmitted data to remove the block effect (POCS/CLS algorithm based regularization); and a constrained quadratic programming. However, these methods cannot be applied in a real-time process because they are all repetitive. Moreover, these methods process data at both the frequency domain and image domain, thereby complicating the construction of a coder and decoder.

Still other methods of reducing the block/ring effect include a method of moving the position of the 8×8 blocks to be coded by an interval of one of two frames in successive images such that the block effect visually appears less; a method of controlling a filtering level using a frequency analyzer; a projection method and a smoothing operation repeating method; and a method of performing a filtering operation based upon the quantization noise information transmitted from a coder. However, these methods all have problems. Namely, most international standards prescribe that blocks have fixed positions, thus the block position should not be moved. Controlling a filtering level only changes pixel values at boundaries between adjacent blocks, resulting in a degradation in the block effect removal. The projection method require a large amount of processing time and the filtering based upon the quantization noise is inefficient because additional information must be obtained from the coder which increases the amount of bits being generated.

OBJECTIVES OF THE INVENTION

An object of the present invention is to solve at least the problems and disadvantages of the related art.

An object of the present invention is to reduce the block and ring effects while maintaining the details of an image. Thus, the object of the present invention is to enhance the picture quality of a reconstructed imaged obtained by decoding a coded bit stream.

Another object of the present invention is to remove the block and ring effects in a compression-coded image.

A further object of the present invention is to remove the block and ring effects in a compression-coded imaged coded at a very low bit rate.

A still further object of the present invention is to remove the block/ring effects in a compression-coded image which is transmitted by a block-by-block basis.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of removing the block and ring effects in a compression-coded image transmitted by a block-by-block basis includes comparing differences between an arbitrary pixel to be filtered and the pixels surrounding the arbitrary pixel with a predetermined threshold value and selecting candidate pixels to be associated with an averaging operation among the surrounding pixels in accordance with the compared results; and selecting the surrounding pixels using any one of five 8-tab masks adaptive to a position of the arbitrary pixel. In four of the five 8-tab masks, the tabs are arranged such that the upper, lower, left and right blocks adjacent to the arbitrary block is longer, respectively. Also, one of the five 8-tab masks is a modified 3×3 filtering mask such that one corner of the 3×3 mask is discarded.

In another embodiment of the present invention, a method of removing the block and ring effects in a compression-coded image transmitted on a block-by-block basis, includes adaptively selecting for a given block a mask to be filtered in consideration of the directions of blocks adjacent to the given block; comparing differences between an arbitrary pixel to be filtered in the selected mask and pixels in the selected mask surrounding the arbitrary pixel with a predetermined threshold value, and selecting pixels to be associated with an averaging operation among the surrounding pixels in accordance with the compared results; and applying a desired weight to the arbitrary pixel in consideration of the number of pixels excluded in the averaging operation, and performing the averaging operation with respect to the arbitrary pixel and the selected pixels for a filtering operation with respect to the arbitrary pixel.

An image decoder according to the present invention which reconstructs an image transmitted on a block-by-block basis and filters the reconstructed image includes a filtering masking unit selecting a filtering mask including an arbitrary pixel to be filtered and pixels surrounding the arbitrary pixel, in consideration of the position of the arbitrary pixel in a given block and in consideration of the directions of blocks adjacent to the given block; candidate pixel selection unit comparing differences between the arbitrary pixel and the surrounding pixels with a predetermined threshold value and selecting candidate pixels to be associated with an averaging operation among the surrounding pixels in accordance with the compared results; and averaging unit averaging with respect to the arbitrary pixel and the candidate pixels selected by the candidate pixel selection unit to perform the filtering operation with respect to the arbitrary pixel.

The candidate pixel selection unit is adapted to exclude each of the surrounding pixels from the averaging operation if a difference between a surrounding pixel and the arbitrary pixel exceeds the predetermined threshold value. The averaging unit is adapted to apply a desired weight to the arbitrary pixel in consideration of the number of pixels excluded by the candidate pixel selection unit to perform the averaging operation with respect to both the arbitrary pixel and the candidate pixels selected by the candidate pixel selection unit.

Preferably, the threshold value is defined as $\delta = k \times q$, where $\delta$ is the threshold value, k is a constant determined in consideration of the position of the arbitrary pixel in the given block and the directions of the blocks adjacent to the given block, and q is a quantization step interval of the given block.

BRIEF DESCRIPTION OF THE DRAWING

The invention will be described in detail with reference to the following drawings in which like reference numerals refer to like elements wherein:

FIGS. 2(a) to 2(e) are views illustrating a variety of mask forms according to the present invention.

DETAILED DESCRIPTION OF THE INVENTION

The present invention removes the block effect and ring effect appearing in a compression-coded image by an adaptive candidate pixel selection.

In the adaptive candidate pixel selection, a mask to be filtered is selected and pixels to be averaged are selected from the pixels in the selected mask. The pixels are selected by comparing differences between a pixel to be filtered and pixels surrounding the pixel to be filtered with a predetermined threshold value $\delta$.

The threshold value $\delta$ is proportionate to a quantization step interval used for the quantization of DCT coefficients in a coder. Namely, the threshold value $\delta$ is varied according to the required objectives. For example, a threshold value $\delta$ used for the removal of the ring effect is smaller than the threshold value used for the removal of the block effect.

After the pixels to be averaged are selected, the averaging operation is performed with respect to the selected pixels and the pixel to be filtered. At this time, a weight may be applied to the pixel to be filtered. The weight, if applied, corresponds to the number of pixels not selected in the selected mask.

For example, if each mask is set to include eight pixels, the weight is determined such that the values of pixels to be averaged can be divided by 8 for the averaging operation even though the number of pixels is smaller than 8. Particularly, the weight determination is performed in a way that the 'division by 8' can be executed by a simple shift command. The use of the shift command makes the averaging operation simple, resulting in a reduction in processing time and thus, a simplification in a decoder construction.

Figure 1:
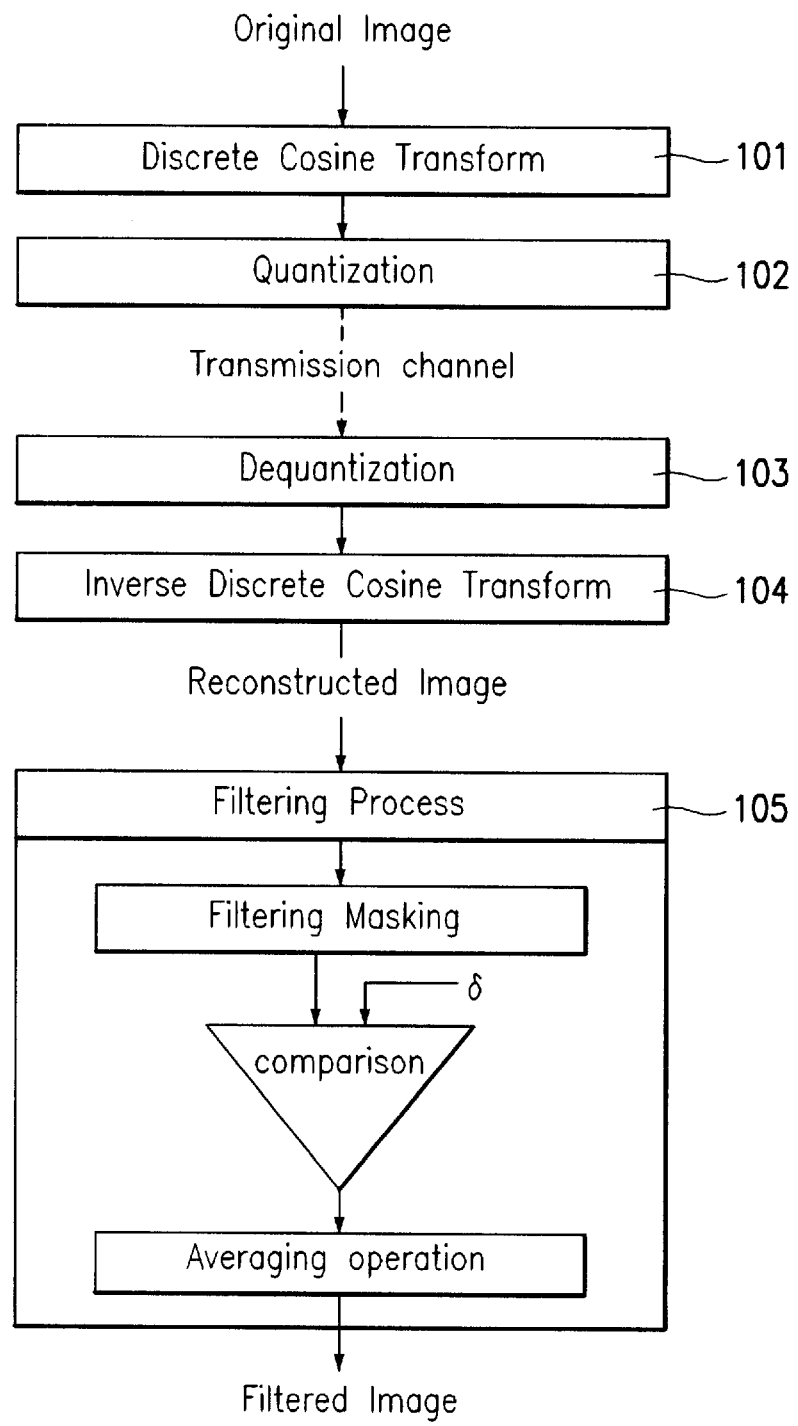
FIG. 1 is a schematic construction of an image coder and decoder in accordance with the present invention.
Figures 2, 3:
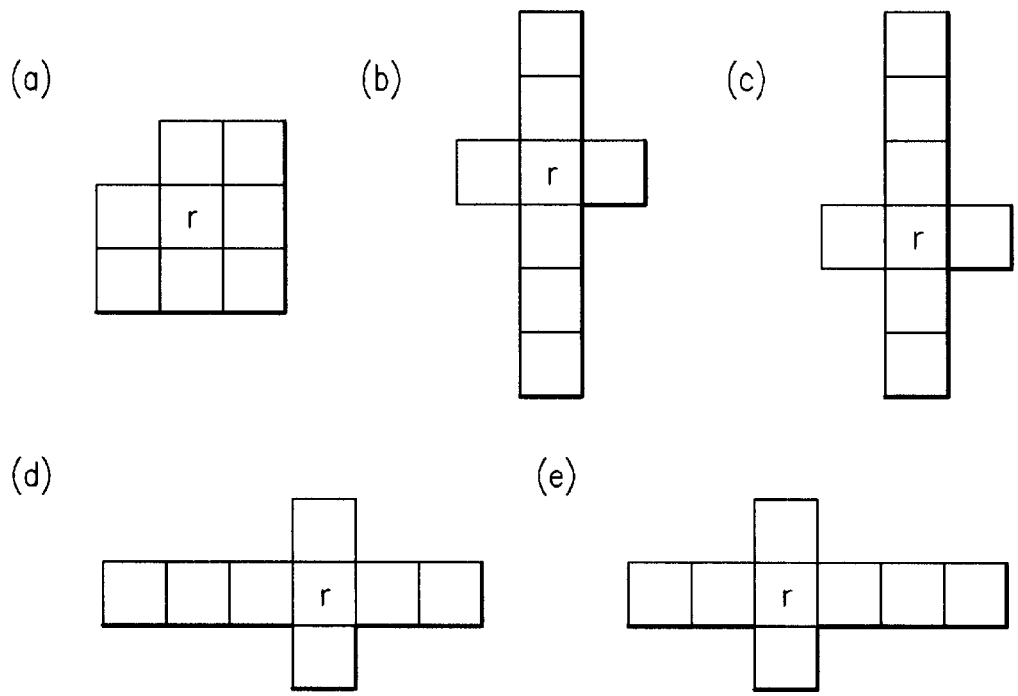
FIG. 3 is a view illustrating mask selections based on positions of a block.

FIG. 1 shows a schematic construction of an image coder and decoder in accordance with the present invention. The image coder includes a discrete cosine transform (DCT) unit 101, and a quantization unit 102. An image decoder includes a dequantization unit 103, an inverse DCT unit 104, and a filtering process unit 105 to perform a filtering operation according the present invention.

In the coder, the original image is divided into blocks, where each block has an 8×8 size. The DCT unit 101 performs a DCT operation with respect to the divided blocks to generate DCT coefficients. The quantization unit 102 quantizes the DCT coefficients from the DCT unit 101 and transmits the coefficients in the form of a bit stream to the decoder through a transmission channel.

The quantization operation may be performed in a variety of ways depending upon the coding method. However, the lower-frequency components generally have relatively larger amounts of significant information regarding the original image than higher-frequency components. As a result, the lower-frequency components are quantized by a shorter quantization step interval and the higher-frequency components are quantized by a longer quantization step interval.

In the decoder, the DCT coefficients are dequantized by the dequantization unit 103 and inverse DCT-processed by the inverse DCT unit 104, to form a reconstructed image.

Thereafter, the filtering process unit 105 of the present invention performs a filtering operation with respect to the reconstructed image to obtain the resultant image, without block effect and ring effect.

Namely, the block effect and the ring effect appear in the reconstructed image of the decoder. The ring effect is generated when quantizing high-frequency components of the DCT coefficients. The ring effect is composed of spatial sinusoidal signals having an average of '0' and generated at a short period. A human's visual system is sensitive to the ring effect near flat areas in which contours of an image are present. The block effect is generated by quantizing low-frequency components of the DCT coefficients. The block effect produces vertical and horizontal partitions in the reconstructed image to which the human eyes are sensitive.

A filtering process of the present invention for reducing the ring effect and the block effect includes determining a mask form, selecting surrounding pixels to be used in the averaging operation, and performing the averaging operation.

As discussed above, a low pass filtering is a simple method to remove the block and ring effect. In the present invention, the mask selection is important. FIGS. 2(a) to 2(e) show a variety of mask forms to be selected in the present invention, wherein the reference character 'r' denotes a reference pixel to be filtered.

Particularly, FIG. 2(a) shows a mask form in which eight tabs are selected from a (3×3) mask form, discarding one left upper tab. This mask form is effective for the center of a block. Although the upper left tab is discarded in FIG. 2(a), any one of the corner tabs may be discarded.

FIG. 2(b) shows a mask form in which more tabs are selected in a vertical direction than a horizontal direction, and more vertical lower tabs are selected than vertical upper tabs. FIG. 2(c) shows a mask form in which more tabs are selected in the vertical direction than the horizontal direction, and more vertical upper tabs are selected than vertical lower tabs. FIG. 2(d) shows a mask form in which more tabs are selected in the horizontal direction than the vertical direction, and more horizontal left tabs are selected than horizontal right tabs. FIG. 2(e) shows a mask form in which more tabs are selected in the horizontal direction than the vertical direction, and more horizontal right tabs are selected than horizontal left tabs.

In FIGS. 2(a) to 2(e), eight tabs are utilized in each of the five masks in consideration of high-speed operation and construction simplification, as will be discussed below. Also, in the preferred embodiment, the five mask forms shown in FIGS. 2(a) to 2(e) are assigned to positions corresponding to the letter of the Figure in an 8×8 block, as shown in FIG. 3.

The mask form in FIG. 2(c) is used in the upper boundary of the block because of the long vertical tabs. This allows an averaging of the pixel to be filtered with a maximum of three pixels in the upper adjacent block. The mask form shown in FIG. 2(b) is used in the lower boundary so that the pixel to be filtered is averaged with maximum of three pixels in the lower adjacent block. The mask form shown in FIG. 2(d) is used in the left boundary so that the pixel to be filtered is averaged with maximum of three pixels in the left adjacent block. The mask form shown in FIG. 2(e) is used in the right boundary so that the pixel to be filtered is averaged with maximum of three pixels in the right adjacent block. Finally, the mask form shown in FIG. 2(a) is used at diagonally from the corners to the center of the 8×8 block so what the pixel to be filtered is averaged with the pixels from the adjacent blocks.

As discussed above, utilizing eight tabs in each of the five masks makes the averaging operation and decoder construction simple, while maintaining the filtering effect. Namely, an averaging operation based on a typical 3×3 mask includes eight additions and one division, which requires a large amount of calculation time. However, a modified 3×3 mask according to the present invention maintains a denominator at '8' and a 'division by 8' can be executed by a simple shift command which requires a small amount of calculation time. As a result, the division can be substituted with a shift operator.

After selecting an appropriate mask, candidate pixels to be averaged may be selected. Rather than averaging all the pixels for a pixel to be filtered, some pixels are excluded from the averaging operation. The pixels are selected based upon a comparison between the difference of the pixel to be filtered from a pixel corresponding to an object contour and the predetermined threshold value $\delta$. Namely, an absolute value of such difference is compared with the predetermined threshold value $\delta$.

If a given pixel is averaged together with pixels forming the object contours, the details of an image are filtered to vanish. Thus, a process of excluding pixels determine as object contours from the averaging operation for a pixel to be filtered would reduce the block and ring effects while maintaining the image details.

Accordingly, a pixel of the selected mask is included in the averaging operation if the difference, i.e. the absolute value, between the pixel of the selected mask and a pixel to be filtered is smaller than the predetermined threshold value $\delta$. If the difference is not smaller, the pixel of the selected mask is excluded from the averaging operation.

Also, to set the denominator of the averaging operation to 8, an appropriate weight is applied to the pixel to be filtered, in consideration of the number of pixels excluded in the averaging operation. For example, if two surrounding pixels are excluded in the averaging operation for a pixel $P_i$, a weight compensating the two pixels are added to the original value of $P_i$. Specifically, a weight of $2 \times P_i$ would be added to the $P_i$, making the value of the pixel to be filtered $3 \times P_i$. Thus, the weight added to the pixel to be filtered is the value of the pixel to be filtered multiplied by the number of pixels excluded.

The threshold value $\delta$ is determined in consideration of the block effect and the ring effect. Because the degrees of the block/ring effects ar proportionate to the quantization step interval, the threshold value $\delta$ is defined as follows:

$$\delta = k \times q$$

where, k is a constant and q is the quantization step interval of a block.

In the preferred embodiment of the present invention, the value k is 1.0 for filtereing pixels at the boundary of the block and 0.6 for filtering pixels within the boundary pixels of the block. The value of k is greater at the block boundaries to cope more efficiently with the block effect.

Thus, the preferred embodiment of the present filtering operation includes selecting an appropriate mask, selecting pixels to be averaged with a pixel to be filtered from the selected mask, and averaging the selected pixels and the pixel to be filtered. Any one of the five 8-tab masks shown in FIGS. 2(a) to 2(e) are selected depending upon the position of the pixel to be filtered in a block, and the pixels in the selected mask, excluding pixels determined as object contours, are averaged with the pixel to be filtered. Moreover, by applying a weight to the pixel to be filtered, the denominator of the averaging operation may be kept constant. Accordingly, the present filtering operation reduces the block effect and the ring effect.

As discussed above, according to the present invention, a determination is made whether pixels surrounding the pixel to be filtered is part of the object contour and an averaging operation is performed based upon the determined result. A modified 3×3 filtering mask is used within a given block to remove the ring effect. Particularly, the masks includes more tabs toward adjacent blocks at boundaries of the given block to remove the block effect and ring effect.

Moreover, pixels to be included in the averaging operation for the filtering operation and pixels to be excluded therefrom are also determined based upon a threshold value, and a weight is applied to a pixel being filtered in the averaging operation in consideration of the number of the excluded pixels such that the denominator remains '8' in the averaging operation. Therefore, the present invention not only reduces the block and ring effects, but reduces the processing time with a simple hardware construction.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A filtering method for a pixel P of a block B in a reconstructed image, comprising:

selecting one of a plurality of filtering masks based upon a position of said pixel P in said block B; and averaging said pixel P and candidate pixels within the selected filtering mask.

2. A method of claim 1, wherein each of the plurality of filtering masks has 8 tabs.

3. A method of claim 1, wherein a filtering mask with more tabs toward a block adjacent said block B is selected.

4. A method of claim 1, further comprising selecting a pixel within the selected filtering mask $P_m$ as a candidate pixel if the value of the pixel $P_m$ meets a predetermined condition.

5. A method of claim 4, wherein the pixel $P_m$ is selected as a candidate pixel if the absolute value of the difference between said pixel P and pixel $P_m$ is less than a threshold value.

6. A method of claim 5, wherein the threshold value is calculated by an equation below, $$\delta = k \times q$$

where k is a constant and q is a quantization step interval of said block B.

7. A method of claim 6, wherein the value of k is 1.0 for filtering boundary pixels of said block B and 0.6 for filtering pixels within the boundary pixels of said block B.

8. A method of claim 4, further comprising adding a weight value to said pixel P prior to the averaging, wherein said weight value is based upon a number of pixels $P_m$ not selected as candidate pixels.

9. A method of claim 8, wherein said weight value is the number of pixels $P_m$ not selected multiplied by the value of said pixel P.

10. A filtering apparatus to filter a pixel P of a block B in a reconstructed image, comprising:

a filtering masking unit selecting one of a plurality filtering masks based upon a position of said pixel P in said block B; and an averaging unit averaging said pixel P and candidate pixels within the selected mask.

11. An apparatus of claim 10, wherein each of the plurality of filtering masks has 8 tabs.

12. An apparatus of claim 11, wherein the plurality of filtereing masks are modified 3×3 mask forms including:

a filtering mask in which eight tabs are selected from the 3×3 mask form, discarding one corner tab;

a filtering mask in which more tabs are selected in a vertical direction than a horizontal direction, and more vertical lower tabs are selected than vertical upper tabs;

a filtering mask in which more tabs are selected in the vertical direction than the horizontal direction, and more vertical upper tabs are selected than vertical lower tabs;

a filtering mask in which more tabs are selected in the horizontal direction than the vertical direction, and more horizontal left tabs are selected than horizontal right tabs; and a filtering mask in which more tabs are selected in the horizontal direction than the vertical direction, and more horizontal right tabs are selected than horizontal left tabs.

13. An apparatus of claim 10, wherein a filtering mask with more tabs toward a block adjacent said block B is selected.

14. An apparatus of claim 10, further comprising:

a comparison unit selecting a pixel within the selected mask $P_m$ as a candidate pixel if the value of the pixel $P_m$ meets a predetermined condition.

15. An apparatus of claim 14, wherein the pixel $P_m$ is selected as a candidate pixel if the absolute value of the difference between said pixel P and pixel $P_m$ is less than a threshold value.

16. An apparatus of claim 15, wherein the threshold value is calculated by an equation below, $$\delta = k \times q$$

where k is a constant and q is a quantization step interval of said block B.

17. An apparatus of claim 16, wherein the value of k is 1.0 for filtering boundary pixels of said block B and 0.6 for filtering pixels within the boundary pixels of said block.

18. An apparatus of claim 14, wherein the averaging unit adds a weight value to said pixel P prior to the averaging, wherein said weight value is based upon a number of pixels $P_m$ not selected as candiate pixels.

19. An apparatus of claim 18, wherein said weight value is the number of pixels $P_m$ not selected multiplied by the value of said pixel P.

20. A coding and decoding method comprising:

a discrete cosine transform (DCT) unit performing a DCT operation with respect to divided blocks of an image to generate DCT coefficients;

a quantization unit quantizing the DCT coefficients and transmitting the DCT coefficients in a form of a bit stream through a transmission channel;

a dequantization unit dequantizing the DCT coefficients received through the transmission channel;

an inverse DCT unit performing an inverse DCT operation with respect to the dequantized DCT coefficients to form a reconstructed image, and a filtering process unit filtering each pixel of each block of the reconstructed image by selecting one of a plurality of filtering masks based upon a position of said pixel in said block; and averaging said pixel and candidate pixels within the selected filtering mask.

* * * * *